United States Patent Office 3,492,372
Patented Jan. 27, 1970

3,492,372
HOT MELT ADHESIVE COMPOSITION BASED ON AN ETHYLENE:PROPYLENE COPOLYMER
Thomas P. Flanagan, Greenbrook, N.J., assignor to National Starch and Chemical Corporation, New York, N.Y., a corporation of Delaware
No Drawing. Continuation-in-part of application Ser. No. 492,259, Oct. 1, 1965. This application May 9, 1968, Ser. No. 728,087
Int. Cl. C08f *29/12, 37/18*
U.S. Cl. 260—897       4 Claims

ABSTRACT OF THE DISCLOSURE

Hot melt adhesive compositions comprising a homogeneous blend of a random ethylene:propylene copolymer; a polyolefin selected from the class consisting of polyethylene, atactic polypropylene, and isotactic polypropylene; and, a polyterpene resin tackifier.

---

This application is a continuation-in-part of my copending application Ser. No. 492,259, filed Oct. 1, 1965, now abandoned; the latter application being a continuation-in-part of application Ser. No. 261,838, filed Feb. 28, 1963, and which issued as U.S. Patent No. 3,220,966 on Nov. 30, 1965.

This invention relates to novel hot melt adhesive compositions. More particularly, it relates to hot melt adhesive compositions comprising blends of elastomeric materials and resin tackifiers in a polyolefinic carrier.

A class of adhesive compositions known as hot melt adhesives have enjoyed continually increasing usage in many industrial applications. These hot melt adhesives, or hot melts, as they are commonly designated, are solid or semi-solid combinations of film forming resins, tackifying resins, rubbery polymers, plasticizers, waxes and similar materials which may be added to the composition in order to impart various properties thereto. Adhesive bonds derived from hot melts are particularly useful because of their tackiness in the molten state and their ultimate highly flexible nature. In addition, hot melts yield adhesive bonds that display resistance to embrittlement under conditions of extreme cold, thereby making them ideal for adhesive applications requiring exposure to low temperatures, such as, for example, frozen food packaging.

In spite of the advantages to be realized by the use of hot metals, the extent of their utilization has nevertheless been limited by several serious shortcomings. Many of these failings can be directly attributed to the deleterious effects of one or more of the components which are included in the hot melt composition. Thus, for example, various types of rubbers are often incorporated in hot melts in order to impart flexibility and tackiness to the resulting adhesive. However, the rubbery materials or elastomers heretofore used in hot melts have not been entirely satisfactory principally because of the presence of unsaturated chemical bonds in the elastomer molecule. Thus, it has been found that the presence of these unsaturated elastomers in hot melts has made the adhesive composition susceptible to oxidation by sunlight or by the oxygen of the air and has also led to the degradation of the hot metal upon prolonged exposure to elevated temperatures.

In addition to the shortcomings attributable to the unsaturated nature of the elastomers heretofore employed in hot melts, other undesirable effects have attended their use in such adhesive compositions. The most serious of these effects has been the incompatibility of the elastomers with the other constituents of the adhesive formulation. This incompatibility is evidenced, in the molten state, by the separation of the elastomer from the remainder of the formulation, thereby resulting in two heterogeneous layers. Such heterogeneous compositions do not therefore derive the improvements in properties which the addition of the elastomers is intended to impart.

It is an object of this invention to provide hot melt adhesive compositions which possess outstanding characteristics of flexibility, tackiness, and strength under widely varying conditions of temperature. Another object of this invention is to provide hot melt adhesive compositions which display remarkable properties of stability and resistance to degradation. A further object of this invention is to provide adhesive compositions which are characterized by their ability to adhere to a wide variety of substrates. Other objects and the advantages of this invention will be apparent from the discussion that follows hereinafter.

In accordance with the invention, hot melt adhesive compositions are prepared which comprise blends of random ethylene:propylene copolymers with certain resin tackifiers, hereinafter defined, said blends being formulated using polyolefinic materials as carriers therefor. I have found that, in contrast to the elastomers heretofore employed, the ethylene:propylene copolymers impart toughness, increased viscosity, and good resistance to oxidative and thermal deterioration to the hot melt adhesives of my invention. In addition, the ethylene:propylene copolymers used in my compositions form stable, compatible solutions with the other components of my formulations, thereby avoiding the difficulties presented by the elastomers of the prior art which formed heterogeneous mixtures in the molten state.

The random ethylene:propylene copolymers are elastomeric materials which, for the purposes of my invention, should have a propylene content of from 25–75 mole percent, and a Mooney viscosity of from 15 to 60.

These random ethylene:propylene copolymers are the copolymers resulting from the copolymerization of monomeric ethylene with monomeric propylene; the latter copolymerization reaction being one which will ordinarily be conducted at low temperatures and in the presence of a so called Ziegler catalyst, i.e. a combination of a transition metal compound and a metal alkyl. A typical process for preparing such random ethylene:propylene copolymers is described in U.S. Patent No. 3,166,538 which issued on Jan. 19, 1965.

These ethylene:propylene copolymers applicable for use in preparing the products of this invention are described as "random" copolymers inasmuch as their molecules comprise essentially linear structures in which there are randomly distributed alternating segments containing one or more moieties derived from the ethylene or propylene monomers from which they are prepared. Thus, these random ethylene:propylene copolymers are to be distinguished from the so called "graft" copolymers such, for example, as those described in U.S. Patent No. 3,299,181 which issued on Jan. 17, 1967. Such graft copolymers are prepared by heating a mixture of previously prepared polypropylene and polyethylene so that the resulting composition thereby has a backbone or main chain comprising a molecule of polyethylene along the length of which pendant groups comprising short lengths, or grafts, of polypropylene have been chemically bonded at various intermittently situated positions.

Thus, in addition to having been prepared from two polymeric species whereas my applicable ethylene:propylene copolymers are derived from two monomeric species, such graft copolymers also differ from my random ethylene:propylene copolymers by virtue of their structural configuration wherein large numbers of pendant polypropylene groups are present as opposed to the absence of such pendant groups in the essentially linear, unbranched structure of my specified polymers. However, of even greater significance is the fact that such graft copolymers derived from polyethylene and polypropylene are not elastomeric, i.e. rubbery, compositions as are my random ethylene:propylene copolymers but are, rather, stiff and decidedly brittle materials. Needless to say, the latter properties do not readily permit the use of these graft copolymers in adhesive products of the type sought to be produced in the process of the subject invention.

In my said parent application, now Patent No. 3,220,-966, I describe and claim such hot melt adhesive compositions wherein the resin tackifiers comprise natural rosins, hydrogenated rosins, rosin esters atactic polypropylene, and chlorinated biphenyl resins containing from 32% to 65% chlorine.

The resin tackifiers which are utilized in the novel adhesive compositions of the present application comprise polyterpene resins having a ball and ring softening point of from about 10° to about 135° C. as determined by A.S.T.M. method E28–58T. These polyterpene resins are produced by polymerizing the alpha or beta isomers, or their mixtures, of the bicyclic, mono-terpene known as pinene. The latter polymerization is conducted by heating a solution of the pinene, or of turpentine wherein the pinenes comprise the main constituents, in a hydrocarbon diluent in the presence of a catalyst of the Friedel-Crafts type whereupon unpolymerized material is removed by distillation at reduced pressure. The resulting resins are thermoplastic, pale amber, transparent materials which are soluble in a wide variety of solvents.

The carriers used for the adhesives of this invention may be either polyethylene, isotactic (i.e., crystalline) polypropylene or atactic, i.e. amorphous, polypropylene. The polyethylene utilized as a carrier may range in molecular weight from about 2,000 to about 21,000. It is preferred, however, to employ polyethylene having a molecular weight of from 8,000 to 12,000. The isotactic polypropylene suitable for use as a carrier in my adhesives should have a melt flow (as determined by ASTM method D 123–57T) ranging from 5 to 100. Low molecular weight isotactic polypropylene having a melt viscosity of from 3,000 centiposies to 5,000 centipoises at 350° F. can also be used, as a carrier, to prepare my hot melt adhesives. As for the atactic polypropylene, it should have a melt viscosity weight in the range of from about 1,000 to 15,000 centiposies as determined, at 350° F., using a Brookfield RVS viscometer with a #6 spindle at a spindle speed of 20 r.p.m. (It is to be noted that all melt viscosities referred to in this disclosure were determined under the latter conditions.) Blends of any two or more of the three above described resins can, if desired, be employed as carriers for my novel adhesives.

Various miscellaneous additives may be incorporated in the adhesive formulations of this invention. Of particular utility in adjusting viscosity and hardness is the use of waxes or the wax-like materials including, for example, petroleum waxes such as paraffin and microcrystalline wax, or synthetic waxes such as Fischer-Tropsch wax.

The polyterpene resin tackifiers heretofore described may be present in the formulations of this invention in amounts ranging from about 100 to 1000 parts per 100 parts, by weight, of the ethylene:propylene copolymer. When a wax is added to the formulation, it may be present in amounts ranging from about 50 to about 200 parts per 100 parts, by weight, of the ethylene:propylene copolymer. As far as the polyolefin carrier is concerned, it may be present in amounts ranging from about 150 to about 1500 parts per 100 parts, by weight, of the ethylene:propylene copolymer.

In preparing the adhesives of my invention, about one-half of the polyterpene tackifying resin is first melted at a temperature ranging from 200° to 400° F., whereupon the ethylene:propylene copolymer is added to the molten tackifier. The resulting mixture is blended until a smooth, homogeneous mass is obtained and the remainder of the formulation, i.e., the remainder of the tackifier, the polyolefin carrier, and other miscellaneous additives, are then added to the uniform mass. Thereafter, the entire mixture is blended until the mass is smooth and homogeneous. The final hot melt adhesive composition may then be used directly, or it may be extruded in rope or pellet form for use in an appropriate hot melt applicator. It should be noted that the adhesives of this invention can be applied by any of the hot melt applicators commonly used by the practitioner. Although these compositions can be applied in any thickness the practitioner finds expedient, it is preferred to employ coating thickness of from 0.5 mil to 25 mils.

The hot melt adhesives of my invention display several outstanding features. Of primary importance is the fact that the adhesive bonds derived from my hot melts are characterized by remarkable tackiness in the molten state and flexibility upon solidification. They also are extremely resistant to oxidative or thermal degradation and embrittlement at low temperatures. Moreover, my adhesives are highly stable as a result of the excellent compatibility displayed by the various components of said adhesives. The present compositions have the added advantage of possessing a low specific gravity which results from the very low specific gravity of the ethylene:propylene copolymers. This decreased specific gravity of my hot melts therefore leads to a considerable economic saving since less adhesive is required in order to cover a given area of substrate as compared to the use of adhesives of greater specific gravity. Furthermore, my adhesives are characterized by their ability to be readily coated onto and used for the lamination of various types of substrates, including, for example, metal foils, paper, coated paper, waxed paper, and polyethylene and polypropylene films.

In the following examples, which further illustrate the embodiment of my invention, all parts given are by weight unless otherwise indicated.

EXAMPLE I

This example illustrates the preparation of the hot melt adhesive compositions of my invention.

In preparing this product, 125 parts of a polyterpene resin having a ball and ring softening point of 115° C. were melted and to this molten tackifier were added 100 parts of a random ethylene:propylene copolymer prepared as described hereinabove, having a propylene content of 33 mole percent and a Mooney viscosity of 25. The resulting mixture was blended until a smooth, homogeneous mass was obtained. To this homogeneous mass were added 125 parts of said polyterpene resin, 400 parts of polyethylene (molecular weight=8,000) and 250 parts of polyethylene (molecular weight=2,000), the entire mixture then being blended until homogeniety was obtained. The resulting homogeneous mass had a Brookfield viscosity of 19,250 cps. at 350° F. and showed excellent wetting properties for metal foils and polyethylene.

EXAMPLE II

This example further illustrates the preparation of the hot melt adhesive compositions of my invention.

The procedure detailed in Example I was employed to prepare the adhesive formulations set forth in the table appearing below.

The random ethylene:propylene copolymer utilized in the formulations of this example was prepared as described hereinabove and had a propylene content of 47 mole percent and a Mooney viscosity of 49.

| Component | Formulation No. | | | | | | | |
|---|---|---|---|---|---|---|---|---|
| | 1 | 2 | 3 | 4 | 5 | 6 | 7 | 8 |
| Ethylene: propylene copolymer | 100 | 100 | 100 | 100 | 100 | 100 | 100 | 100 |
| Fischer-Tropsch wax | | 132 | | | | | | |
| Polyethylene (molec. wt.=8,000) | 400 | | 300 | | | | | |
| Polyethylene (molec. wt.=12,000) | | 200 | | | | 300 | | |
| Polyethylene (molec. wt.=2,000) | 250 | | | | | | | |
| Isotactic polypropylene (melt flow=44 at 230° C.) | | | | 330 | | | | |
| Isotactic polypropylene (melt flow=5 at 230° C.) | | | | | | | | 330 |
| Atactic polypropylene (melt viscosity=4,000 cps.) | | | | | | 400 | 400 | |
| Microcrystalline wax (melt. pt.=190-195° F.) | | | | 250 | | | 50 | |
| Polyterpene resin (softening pt.=115° C.) | 250 | 231 | 350 | 231 | | | | 230 |
| Polyterpene resin (softening pt.=10° C.) | | | | | 100 | | | |
| Polyterpene resin (softening pt.=135° C.) | | | | | | 500 | 500 | |

The adhesive formulations listed in the above table exhibited remarkable properties of stability and resistance to degradation. In addition, these formulations were characterized by their ability to adhere to a wide variety of substrates.

Summarizing, the novel products of this invention are thus seen to comprise improved hot melt adhesive compositions. Variations may be made in proportions, procedures and materials without departing from the scope of this invention defined by the following claims.

I claim:

1. A hot melt adhesive composition consisting essentially of a homogeneous mixture of a random ethylene: propylene copolymer having a propylene content of from 25 to 75 mole percent and a Mooney viscosity of from 15 to 60; a polyolefin selected from the class consisting of polyethylene, isotactic polypropylene and atactic polypropylene; and, as a tackifier for said composition, a polyterpene resin having a ball and ring softening point of from about 10 to 135° C.; wherein said tackifier is present in an amount ranging from about 100 to 1000 parts per 100 parts of the random ethylene:propylene copolymer, and said polyolefin is present in an amount ranging from about 150 to 1500 parts per 100 parts of the random ethylene:propylene copolymer; wherein said polyethylene has a molecular weight of from about 2,000 to 21,000; wherein said isotactic polypropylene has a melt viscosity of from about 3,000 to 5,000 centipoises and a melt flow of from about 5 to 100; and, wherein said atactic polypropylene has a melt viscosity of from about 1,000 to 15,000 centipoises.

2. A hot melt adhesive composition consisting essentially of a homogeneous mixture of a random ethylene: propylene copolymer having a polypropylene content of from 25 to 75 mole percent and a Mooney viscosity of from 15 to 60; isotactic polypropylene having a melt viscosity of from about 3,000 to 5,000 centipoises and a melt flow of from about 5 to 100; and, as a tackifier for said composition, a polyterpene resin having a ball and ring softening point of from about 10 to 135° C.; wherein said tackifier is present in an amount ranging from about 100 to 1000 parts per 100 parts of the random ethylene:propylene copolymer, and said isotactic polypropylene is present in an amount ranging from about 150 to 1500 parts per 100 parts of the random ethylene: propylene copolymer.

3. A hot melt adhesive composition consisting essentially of a homogeneous mixture of a random ethylene: propylene copolymer having a propylene content of from 25 to 75 mole percent and a Mooney viscosity of from 15 to 60; polyethylene having a molecular weight of from about 2,000 to 21,000; and, as a tackifier for said composition, a polyterpene resin having a ball and ring softening point of from about 10 to 135° C.; wherein said tackifier is present in an amount ranging from about 100 to 1000 parts per 100 parts of the random ethylene: propylene copolymer, and said polyethylene is present in an amount ranging from about 150 to 1500 parts per 100 parts of the random ethylene:propylene copolymer.

4. A hot melt adhesive composition consisting essentially of a homogeneous mixture of a random ethylene: propylene copolymer having a propylene content of from 25 to 75 mole percent and a Mooney viscosity of from 15 to 60; atactic polypropylene having a melt viscosity of from about 1,000 to 15,000 centipoises; and, as a tackifier for said composition, a polyterpene resin having a ball and ring softening point of from about 10 to 135° C.; wherein said tackifier is present in an amount ranging from about 100 to 1000 parts per 100 parts of the random ethylene:propylene copolymer, and said atactic polypropylene is present in an amount ranging from about 150 to 1500 parts per 100 parts of the random ethylene: propylene copolymer.

References Cited

UNITED STATES PATENTS

| 3,148,059 | 9/1964 | Brunson et al. | 97—27 |
| 3,200,173 | 8/1965 | Schilling | 260—878 |
| 3,243,396 | 3/1966 | Hammer | 260—28.5 |
| 3,253,059 | 5/1966 | Vollmar | 260—897 |
| 3,261,889 | 7/1966 | Van't Wout | 260—897 |

MURRAY TILLMAN, Primary Examiner

C. J. SECCURO, Assistant Examiner

U.S. Cl. X.R.

156—334; 161—247; 260—27